(12) United States Patent
Fairweather et al.

(10) Patent No.: US 8,732,068 B2
(45) Date of Patent: May 20, 2014

(54) CREATION AND TRADING OF MULTI-OBLIGOR CREDIT DEFAULT SWAP-BACKED SECURITIES

(75) Inventors: Michael Fairweather, Larchmont, NY (US); Richard K. MacWilliams, New Orleans, LA (US); John Andrew McQuown, Sonoma, CA (US)

(73) Assignee: eBond Advisors LLC, New York, NY (US)

( * ) Notice: Subject to any disclaimer, the term of this patent is extended or adjusted under 35 U.S.C. 154(b) by 0 days.

(21) Appl. No.: 13/538,339

(22) Filed: Jun. 29, 2012

(65) Prior Publication Data
US 2013/0006829 A1    Jan. 3, 2013

Related U.S. Application Data

(60) Provisional application No. 61/503,892, filed on Jul. 1, 2011.

(51) Int. Cl.
*G06Q 40/00* (2012.01)

(52) U.S. Cl.
USPC .............................. 705/37; 705/38; 705/36 R

(58) Field of Classification Search
USPC ...................................................... 705/37, 38
See application file for complete search history.

(56) References Cited

U.S. PATENT DOCUMENTS

| | | | |
|---|---|---|---|
| 6,725,201 B2 | 4/2004 | Joao | |
| 7,089,207 B1 | 8/2006 | Lardy et al. | |
| 7,249,075 B1 | 7/2007 | Altomare et al. | |
| 7,249,083 B2 | 7/2007 | Noraev et al. | |
| 7,340,427 B1 | 3/2008 | Cornell | |
| 7,395,232 B1 | 7/2008 | Pilato | |
| 7,530,490 B1 | 5/2009 | Finkemeier et al. | |
| 7,565,316 B1 | 7/2009 | Amin et al. | |
| 7,930,238 B2 | 4/2011 | Frankel | |
| 8,010,439 B1 * | 8/2011 | Davis | 705/37 |
| 8,078,521 B1 * | 12/2011 | Williams et al. | 705/37 |
| 2002/0095361 A1 | 7/2002 | Trenk et al. | |
| 2002/0194109 A1 | 12/2002 | Takeshi | |
| 2003/0014344 A1 | 1/2003 | Chacko et al. | |
| 2003/0083972 A1 | 5/2003 | Williams | |
| 2003/0115125 A1 | 6/2003 | Lee et al. | |

(Continued)

FOREIGN PATENT DOCUMENTS

| | | |
|---|---|---|
| WO | WO 01/52121 | 7/2001 |
| WO | WO 02/27632 | 4/2002 |

OTHER PUBLICATIONS

Wikipedia: Credit Linked Notes, Dec. 16, 2009 (http://en.wikipedia.org/w/index.php?title=Credit-linked_note&oldid=332136262).*

(Continued)

*Primary Examiner* — Narayanswamy Subramanian
*Assistant Examiner* — Asha Puttaiah
(74) *Attorney, Agent, or Firm* — Sterne, Kessler, Goldstein & Fox PLLC

(57) ABSTRACT

A system, method, and computer program product are provided for the creation of enhanced securities. Enhanced bonds are backed by the security of a credit default swap contract without the need for separate purchase thereof. Building on this approach, multi-obligor securities can also be credit enhanced to provide a single security reflecting the position of the multi-obligor securities and a backing credit default swap contract.

12 Claims, 10 Drawing Sheets

(56) References Cited

U.S. PATENT DOCUMENTS

| | | | |
|---|---|---|---|
| 2003/0135448 A1 | 7/2003 | Aguias et al. | |
| 2003/0135450 A1 | 7/2003 | Aguais et al. | |
| 2003/0225648 A1 | 12/2003 | Hylton | |
| 2004/0024671 A1 | 2/2004 | Freund | |
| 2004/0044611 A1 | 3/2004 | Heppenstall Jr | |
| 2004/0143528 A1 | 7/2004 | Spieler et al. | |
| 2004/0181475 A1 | 9/2004 | Haroon | |
| 2004/0199451 A1 | 10/2004 | Benning et al. | |
| 2004/0225598 A1 | 11/2004 | Goldberg et al. | |
| 2004/0260643 A1* | 12/2004 | Glicksman et al. | 705/38 |
| 2005/0021452 A1 | 1/2005 | Lipton et al. | |
| 2005/0080734 A1 | 4/2005 | Lynch et al. | |
| 2005/0086152 A1 | 4/2005 | Sweeting | |
| 2005/0108145 A1 | 5/2005 | Kastel et al. | |
| 2005/0144119 A1* | 6/2005 | Monsen et al. | 705/38 |
| 2005/0154664 A1* | 7/2005 | Guy et al. | 705/35 |
| 2005/0187857 A1 | 8/2005 | Tull, Jr. | |
| 2005/0216316 A1 | 9/2005 | Brisbois et al. | |
| 2005/0216399 A1 | 9/2005 | Colvin | |
| 2005/0234795 A1* | 10/2005 | Hodes et al. | 705/36 |
| 2005/0289037 A1 | 12/2005 | Smith et al. | |
| 2006/0085325 A1 | 4/2006 | Shahnaz et al. | |
| 2006/0143099 A1 | 6/2006 | Partlow et al. | |
| 2006/0143106 A1 | 6/2006 | Henninger et al. | |
| 2006/0173771 A1 | 8/2006 | Johnston | |
| 2006/0195375 A1 | 8/2006 | Bohn | |
| 2006/0212380 A1 | 9/2006 | Williams et al. | |
| 2006/0224494 A1 | 10/2006 | Pinkava | |
| 2006/0253361 A1 | 11/2006 | Robinson et al. | |
| 2006/0265301 A1 | 11/2006 | Chorna et al. | |
| 2006/0282355 A1* | 12/2006 | Canezin et al. | 705/35 |
| 2007/0050280 A1 | 3/2007 | Madle et al. | |
| 2007/0083447 A1 | 4/2007 | Corcoran et al. | |
| 2007/0198396 A1 | 8/2007 | Dinc et al. | |
| 2007/0239580 A1 | 10/2007 | Ciampi | |
| 2007/0288351 A1 | 12/2007 | Huntley | |
| 2007/0294158 A1 | 12/2007 | Patel et al. | |
| 2008/0005016 A1 | 1/2008 | Uhlmann et al. | |
| 2008/0010221 A1 | 1/2008 | Co et al. | |
| 2008/0033863 A1 | 2/2008 | Simons et al. | |
| 2008/0052207 A1 | 2/2008 | Paglin | |
| 2008/0071701 A1 | 3/2008 | Phillips et al. | |
| 2008/0082437 A1 | 4/2008 | Co et al. | |
| 2008/0103961 A1 | 5/2008 | Ramani et al. | |
| 2008/0133427 A1 | 6/2008 | Watson et al. | |
| 2008/0154789 A1 | 6/2008 | Lai et al. | |
| 2008/0195519 A1 | 8/2008 | Stevens | |
| 2008/0243721 A1 | 10/2008 | Joao | |
| 2008/0281742 A1 | 11/2008 | Lyons et al. | |
| 2008/0288419 A1 | 11/2008 | Miles et al. | |
| 2008/0294567 A1 | 11/2008 | Chada et al. | |
| 2009/0012892 A1 | 1/2009 | Biase | |
| 2009/0012893 A1 | 1/2009 | Davies | |
| 2009/0030852 A1 | 1/2009 | Braun et al. | |
| 2009/0083196 A1 | 3/2009 | Volpert | |
| 2009/0106133 A1 | 4/2009 | Redmayne | |
| 2009/0198629 A1 | 8/2009 | De Prisco et al. | |
| 2009/0276234 A1 | 11/2009 | Metz | |
| 2009/0299894 A1 | 12/2009 | Chorna et al. | |
| 2010/0036757 A1 | 2/2010 | Patterson et al. | |
| 2010/0125518 A1 | 5/2010 | Jaffrey | |
| 2010/0211416 A1 | 8/2010 | Frank et al. | |
| 2011/0196772 A1 | 8/2011 | MacWilliams et al. | |
| 2011/0196806 A1 | 8/2011 | MacWilliams et al. | |
| 2012/0059755 A1 | 3/2012 | MacWilliams et al. | |

OTHER PUBLICATIONS

Cao et al., "The Information Content of Option—Implied Volatility for Credit Default Swap Valuation," FDIC Center for Financial Research, Sep. 9, 2009, Working Paper No. 2007-08, Social Science Electronic Publishing, INC 2009.

Collin-Dufresne et al., "On the Term Structure of Default Premia in the Swap and LIBOR Markets," The Journal of Finance; vol. 56, No. 3, Jun. 2001; pp. 1095-1115, Published by: Blackwell Publishing for the American Finance Association.

Das, Sanjiv Ranjan, "Credit Risk Derivative," The Journal of Derivatives, Spring 1995, vol. 2, No. 3, pp. 7-23, DOI: 10.3905/jod.1995. 407914.

"House Financial Services Committee Hearing—Reform of the Over-the-Counter Derivative Market: Limiting Risk and Ensuring Fairness," Oct. 7, 2009, Congressional Documents and Publications, CONGDP, 2009 Federal Information & News Dispatch, Inc.

International Search Report and Written Opinion for the International Patent Application No. PCT/US2010/046187, ISA/KR, Korean Intellectual Property Office, Republic of Korea, dated Apr. 12, 2011.

International Search Report and Written Opinion for International Application No. PCT/US2012/045006, United States Patent and Trademark Office, Alexandria, Virginia, United States, dated Sep. 18, 2012.

Longstaff et al., "Corporate Yield Spreads: Default Risk or Liquidity? New Evidence from the Credit Default Sawp," Market The Journal of Finance, vol. LX, No. 5, Oct. 2005.

Qi et al., "Research on the Shift of Default Risk in Supply Chain Based on the Credit Default Swap," Electronic Commerce and Security, 2008 International Symposium on Aug. 3-5, 2008, pp. 810-813, Digital Object Indentifier 10.1109/ISECS.2008.189.

Xu et al., "A Tree Model for Pricing Credit Default Swaps with Equity, Market and Default Risk," Management and Service Science, 2009, MASS '09, International Conference on Sep. 20-22, 2009, pp. 1-5, Digital Object Indentifier 10.1109/ICMSS.2009.5301932.

* cited by examiner

CREATION AND TRADING OF MULTI-OBLIGOR CREDIT DEFAULT SWAP-BACKED SECURITIES

CROSS-REFERENCE TO RELATED APPLICATIONS

The present application claims the benefit of U.S. Provisional Patent Application No. 61/503,892, filed Jul. 1, 2011, which is incorporated by reference herein in its entirety.

The present application is additionally related to U.S. patent application Ser. No. 13/295,420, filed Nov. 14, 2011, which is a continuation of U.S. patent application Ser. No. 12/839,218, filed Jul. 19, 2010, which is a continuation-in-part of U.S. patent application Ser. No. 12/703,073, filed Feb. 9, 2010, all of which are incorporated by reference herein in their entireties.

BACKGROUND

1. Field

Embodiments of the present invention relate generally to investment vehicles, and, more particularly, to multi-obligor securities and credit default swaps.

2. Background

U.S. patent application Ser. Nos. 12/703,073, 12/839,218, and 13/295,420, incorporated by reference above, disclose the formation of a new investment vehicle termed an "enhanced bond" or "eBond," among other things. The approaches provided therein for the formation of eBonds can be extended and applied to the creation of other new investment vehicles that will allow investors to represent other, more complex positions with a single investment.

SUMMARY

Embodiments of the invention include a method comprising purchasing, by one or more computing devices, a credit default swap contract on an exchangeable security, wherein the exchangeable security is comprised of multi-obligor financial instruments, instructing, by the one or more computing devices, a trustee to exchange the exchangeable security for a separate single enhanced security that is a combination of the exchangeable security and the credit default swap contract, and deliver the enhanced security to an investor, and delivering, by the one or more computing devices, the credit default swap contract to an account held at a clearing member.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS

The accompanying drawings, which are incorporated herein and form a part of the specification, illustrate embodiments of the present invention and, together with the description, further serve to explain the principles of the invention and to enable a person skilled in the relevant art to make and use the invention.

Figure 1:
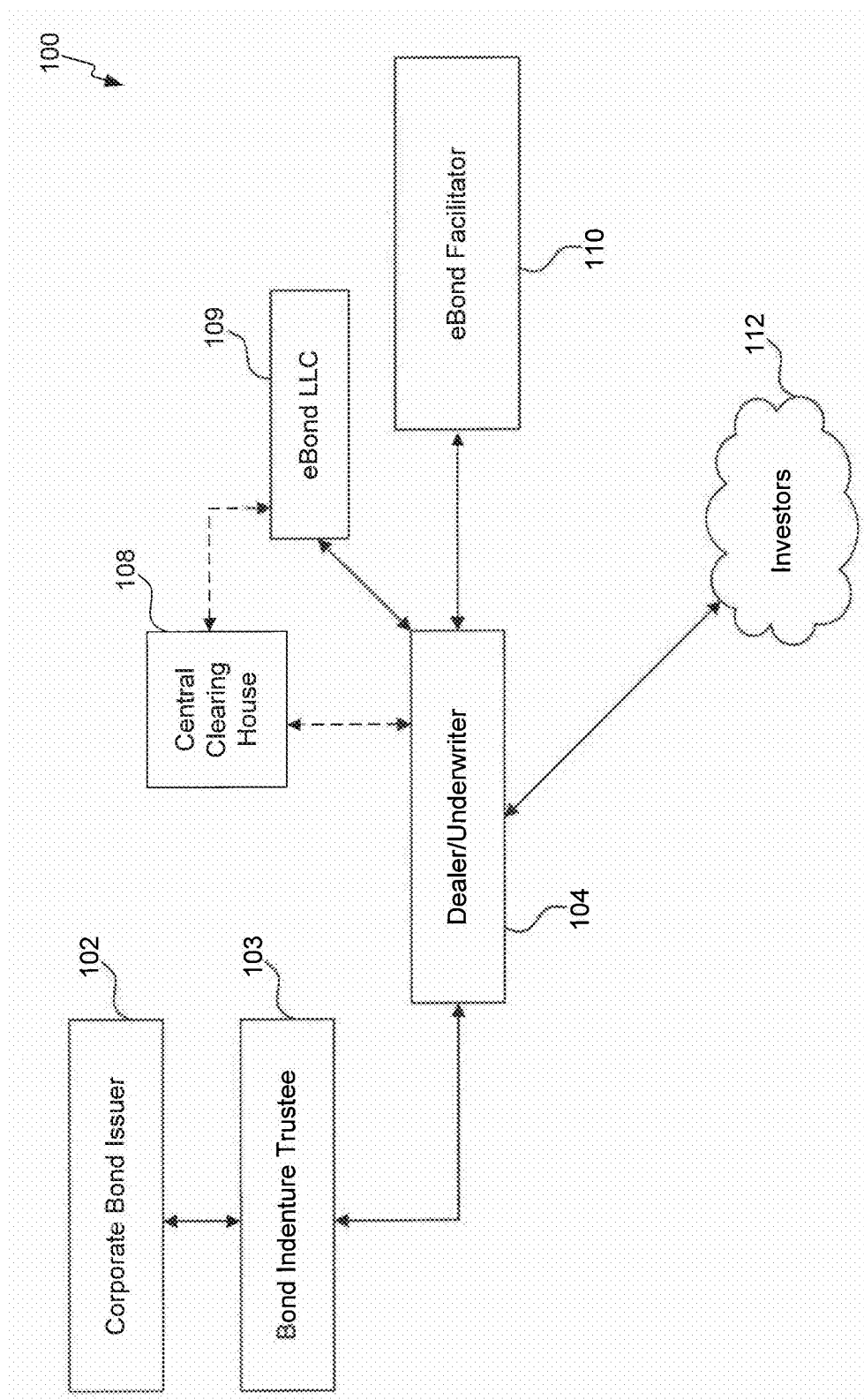
FIG. 1 is a diagram illustrating the interactions between financial entities involved in the creation of eBonds, in accordance with an embodiment of the present invention.

Embodiments of the present invention will now be described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

I. Introduction

The following detailed description refers to the accompanying drawings that illustrate exemplary embodiments consistent with this invention. Other embodiments are possible, and modifications can be made to the embodiments within the spirit and scope of the invention. Therefore, the detailed description is not meant to limit the invention. Rather, the scope of the invention is defined by the appended claims.

It would be apparent to one of skill in the art that the present invention, as described below, can be implemented in many different embodiments of software, hardware, firmware, and/or the entities illustrated in the figures. Any actual software code with the specialized control of hardware to implement the present invention is not limiting of the present invention. Thus, the operational behavior of the present invention will be described with the understanding that modifications and variations of the embodiments are possible, and within the scope and spirit of the present invention.

Reference to modules in this specification and the claims means any combination of hardware or software components for performing the indicated function. A module need not be a rigidly defined entity, such that several modules may overlap hardware and software components in functionality. For example, a software module may refer to a single line of code within a procedure, the procedure itself being a separate software module. One skilled in the relevant arts will understand that the functionality of modules may be defined in accordance with a number of stylistic or performance-optimizing techniques, for example.

II. Enhanced Bonds and Exchangeable Bonds

The creation of an enhanced bond ("eBond") instrument and its handling is described in detail in U.S. patent application Ser. No. 13/295,420, filed Nov. 14, 2011, which is a continuation of U.S. patent application Ser. No. 12/839,218, filed Jul. 19, 2010, which is a continuation-in-part of U.S. patent application Ser. No. 12/703,073, all of which are incorporated by reference in their entireties. Some example operations and embodiments of eBonds follow.

Credit default swaps ("CDS") are a type of derivative investment that allow one party to transfer the default risk of an asset to another party. A typical CDS contract involves a buyer making regular payments to a seller of the CDS, with the buyer receiving a payoff if a predetermined credit instrument, such as a bond, goes into default. A consequence of this is the ability to use a CDS to offset some or all of the default risk of holding a bond. Although a buyer of a CDS contract need not have financial exposure to the instrument, in this case a bond, bond holders can purchase CDS contracts so they can collect on the bond if the bond issuer remains solvent, or on the CDS in the event that the bond issuer defaults. However, this arrangement poses a number of difficulties. For example, an investor would have to engage in multiple transactions in order to express a single financial point of view, which requires additional transaction costs. Additionally, not all investors are permitted to purchase every grade of bond, nor CDS contracts.

A large problem traditionally has also involved the additional exposure a CDS contract brings. Counterparties to a CDS contract run the risk that the other will default on his obligations, leaving perhaps a buyer who cannot collect from the seller if a third party has defaulted on a bond, or a seller who cannot collect ongoing payments from a buyer who has defaulted. For a buyer who also has financial exposure to the subject financial instrument, in this case a bond, the risk of a default by both the bond issuer and the CDS seller is perhaps an insurmountable hurdle to engaging in this type of arrangement.

More recently, regulations have gone into effect to reign in some of the problems associated with CDS contracts and to otherwise stabilize the derivatives market. Notably, in the case of CDS contracts, central clearing houses or central counterparties ("CCPs") have been created which act as the counterparty to both the CDS seller and the CDS buyer. CCPs are, at present, government-approved entities that meet certain requirements to guarantee their stability. The CCPs, as counterparty to both buyer and seller of CDS contracts, bear responsibility to each party should the other default.

The guarantee provided by the availability of a CCP for the purchase of CDS contracts allows for an innovative solution to offering a single financial instrument that incorporates the yield of a bond with the security of a CCP-backed CDS. Specifically, a new type of investment termed an enhanced bond (or "eBond") is created that combines corporate bonds with CDS contracts for those same corporate bonds, in accordance with an embodiment of the present invention.

FIG. 1 is a diagram 100 illustrating the interactions between financial entities involved in the creation of eBonds, in accordance with an embodiment of the present invention. One skilled in the relevant arts will appreciate that other entities may be involved other than those shown, and a single entity may serve more than one of the roles illustrated in diagram 100. Accordingly, the interactions shown in diagram 100 are provided by way of example, and not limitation.

Central clearing house 108 is equivalent to the previously-discussed CCP, in accordance with an embodiment of the present invention. CCP 108 acts as a counterparty to both a CDS seller and a CDS buyer. As will be further discussed below, in a non-limiting exemplary embodiment, dealer 104 will serve as the CDS seller, and an eBond LLC 109 will serve as the CDS buyer.

A corporate bond issuer 102 prepares a bond offering. This process includes the creation of a bond indenture and the identification of a bond indenture trustee 103 to manage the specifics of the bond indenture. The bond indenture specifies, for example, the obligations of corporate bond issuer 102 to repay the bond, and other information such as the maturity date of the bond.

In accordance with an embodiment of the present invention, a bond indenture for an exchangeable bond ("xBond") further specifies exchangeability provisions for the bond. As will be further described herein, the bond indenture includes a reference to a CDS which can be provided in exchange for conversion of the xBond to a particular eBond.

A corporate bond issuer 102 then offers the xBonds for sale to dealer 104, in accordance with an embodiment of the present invention. In accordance with a further embodiment of the present invention, dealer 104 serves as an "underwrite", purchasing all of the bonds offered by corporate bond issuer 102 for resale. Although dealer 104 is presented as a single entity in diagram 100, one skilled in the relevant arts will recognize, as previously noted, that several parties may collaborate (e.g., as a syndicate) in order to perform the functions attributed herein to dealer/underwriter 104.

Traditionally, dealer 104 would then resell the corporate bonds directly to investors 112. Investors 112 would then generally consider the credit ratings of the bonds and purchase them at a price determined, at least in part, by such factors as the bond issuer's credit rating, the bond's coupon amount, maturity date, and par value. However, for the reasons previously discussed, investors 112 may be limited by which bonds they may purchase.

In accordance with an embodiment of the present invention, dealer 104 can purchase xBonds from bond issuer 102 and sell CDS contracts to an eBond LLC 109. Dealer 104 is able to act as the principal for the CDS contracts in accordance with an embodiment of the present invention. However, one skilled in the relevant arts will appreciate that the CDS contracts can be obtained by dealer 104 through other means.

In accordance with a further embodiment of the present invention, dealer 104 novates the CDS contract to CCP 108, such that CCP 108 becomes the obligor on the contract. This is accomplished by meeting CCP's 108 requirements for the creation of the CDS contract, which then permits the novation to take place. The effect of this novation is that CCP 108 becomes the buyer to a CDS contract seller, and the seller to a CDS contract buyer. In this case, CCP 108 is obligated to meet the dealer's 104 obligations as CDS contract seller to eBond LLC 109, and to meet eBond LLC's 109 obligations as CDS contract buyer to dealer 104. One skilled in the relevant arts will appreciate that other methodologies for backing a CDS contract may be used, and novation to CCP 108 is provided by way of example, and not limitation.

With the CDS contract sold to eBond LLC 109, dealer 104 then is then able to exchange the xBonds for eBonds per the provisions of the bond indenture, in accordance with a further embodiment of the present invention. An exemplary mechanism of this exchange, as well as a description of the eBond LLC is described further below.

Figure 2:
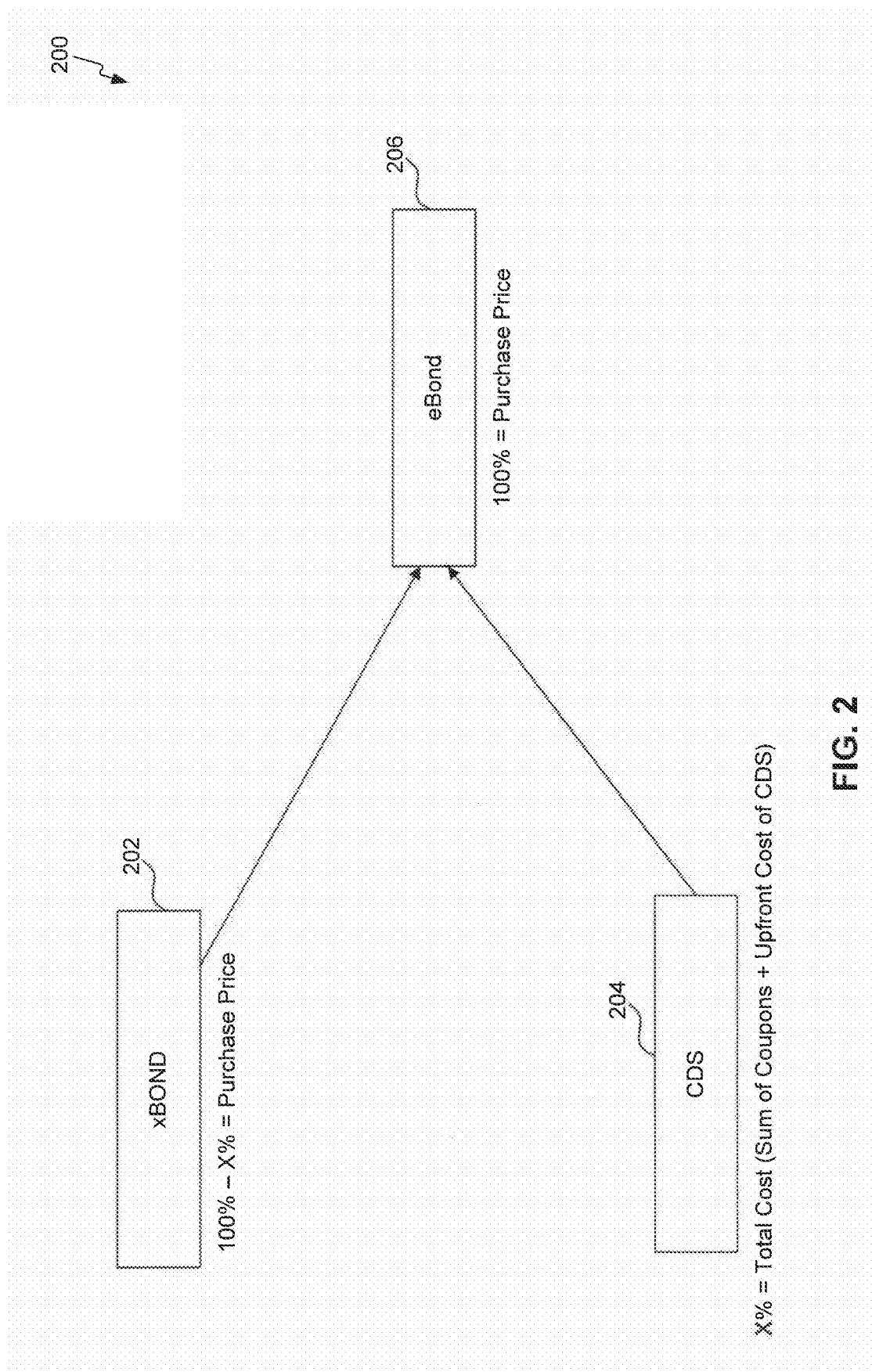
FIG. 2 is a diagram illustrating the components of an eBond exchange, in accordance with an embodiment of the present invention.

FIG. 2 is a diagram 200 illustrating the components of an eBond exchange, in accordance with an embodiment of the present invention. An xBond 202 is, by its nature, exchangeable into an eBond 206. The requirements for this exchange are provided by the bond indenture of the xBond, which includes a reference to a CDS 204, in accordance with a further embodiment of the present invention. One skilled in the relevant arts will appreciate that the exchange described in FIG. 2 can take place on an electronic trading platform without manual intervention.

A bond issuer, such as corporate bond issuer 102, enters into an agreement with eBond facilitator 110 to specify the requirements for the creation of xBonds 202, in accordance with an embodiment of the present invention. An exemplary eBond facilitator is eBond Advisors, LLC, formed under the laws of Delaware. As previously noted, one skilled in the relevant arts will understand that any number of entities may specify the parameters for the creation of xBonds 202. Bonds issued by bond issuer 102 which meet these requirements are the bonds that a dealer 104 can exchange into eBonds 206, in accordance with an embodiment of the present invention. These requirements are specified within the bond indenture for xBonds 202.

Figure 3:
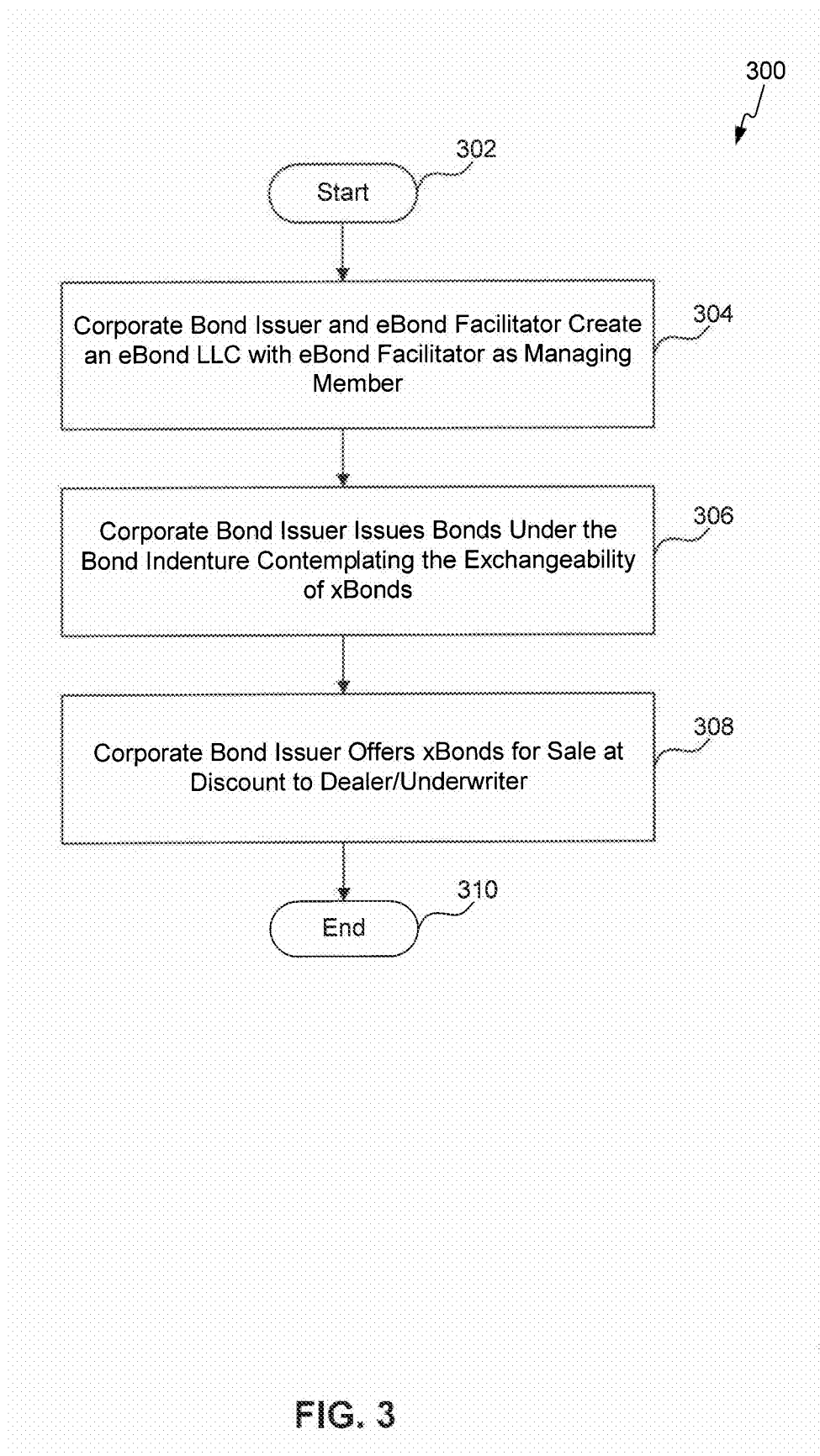
FIG. 3 is a flowchart illustrating steps by which a bond issuer is able to create the initial xBond offering which can be exchanged into eBonds, in accordance with an embodiment of the present invention.

FIG. 3 is a flowchart 300 illustrating steps by which bond issuer 102 is able to create the initial xBond offering which can be exchanged into eBonds, in accordance with an embodiment of the present invention. The method begins at step 302 and proceeds to step 304 where the aforementioned agreement between bond issuer 102 and eBond facilitator 110 results in the formation of, for example, an eBond LLC 109, in accordance with an embodiment of the present invention. For the purposes of the discussion herein, actions taken by, or on behalf of, eBond LLC 109 are generally discussed in the context of eBond facilitator 110 in its role as managing member. The structure and obligations of eBond LLC 109 are further discussed below. Although the present description will refer to an LLC corporate structure, one of skill in the relevant arts will recognize that corporate structures other than an LLC may also be created without departing from the spirit and scope of the present invention.

At step 306, bond issuer 102 issues bonds in accordance with the requirements set forth in the aforementioned bond indenture agreement contemplating the exchangeability of xBonds 202, in accordance with an embodiment of the present invention. These requirements, examples of which will be provided below, are specified in the bond's indenture agreement, which include reference to the bonds' ability to be exchanged into eBonds. These bonds are termed xBonds 202, as previously discussed. Aside from compliance with the specified requirements, xBonds 202 are otherwise normal corporate bonds that bond issuer 102 would otherwise issue. They can be traded in the same manner as any other corporate bond issued by bond issuer 102, and would be associated with bond issuer's 102 credit rating, in accordance with an embodiment of the present invention.

Bond issuer 102 then offers xBond 202 for sale at step 308, in accordance with an embodiment of the present invention. In accordance with a further embodiment of the present invention, this xBond 202 is offered at a discounted price to a dealer 104, as an Original Issue Discount ("OID") bond. This discount reflects the difference between a corresponding eBond 206 which will be the subject of a later exchange and the cost of a CDS 204 used to exchange xBond 202 into eBond 206, in accordance with an additional embodiment of the present invention. In accordance with a further embodiment of the present invention, xBond 202 is offered at par value to dealer 104, reflecting a discount from a premium value to be charged for a corresponding eBond 206. One skilled in the relevant arts will appreciate that different pricing methodologies may be used, and the use of OID/par and par/premium is shown by way of example, and not limitation. The logistics behind this exchange are further discussed below. The method then ends at step 310.

By this process, bond issuer 102 has placed on the market more than a simple corporate bond with its associated bond rating. The ability to exchange the issued xBond 202 into an eBond 206 creates myriad investment opportunities, allowing the investor to exchange xBond 202 into a particular eBond 206 which represents the investor's desired level of risk. Transaction costs normally associated with the sale and purchase of bonds to realign a bond portfolio with a particular risk objective are thereby reduced or avoided entirely.

In accordance with a non-limiting embodiment of the present invention, the bond indenture can be used to specify a requirement for the creation of an xBond 202 for a maturity date which coincides with a particular CDS 204 offering. This can be facilitated by specifying, in the bond indenture, a particular date on which a created xBond 202 will mature. In a non-limiting example, the aforementioned bond indenture may specify that bond issuer 102 should issue xBonds 202 such that they mature on the 20th of December, March, June, or September. By having xBonds 202 and referenced CDS contracts 204 mature on the same date, the pricing of eBonds 206 is made more efficient, although one skilled in the relevant arts will appreciate that other means of aligning the effective periods for xBonds 202 and CDS contracts 204 may be used, or not at all. As will be further discussed below, CDS contract 204 is provided to eBond LLC 109 for holding as collateral for an enhanced CDS ("eCDS") which it issues, in accordance with a further embodiment of the present invention.

One skilled in the relevant arts will recognize, however, that it is not strictly necessary for CDS contracts 204 to mature on the same date as xBonds 202. In accordance with another embodiment of the present invention, CDS contract 204 matures past the maturity date of xBonds 202, even though this has the effect of providing unnecessary additional coverage. In accordance with still another embodiment of the present invention, the maturity date of the eCDS is configured to coincide with the maturity date of xBonds 202, regardless of the maturity date of the underlying CDS contracts 204.

Figure 4:
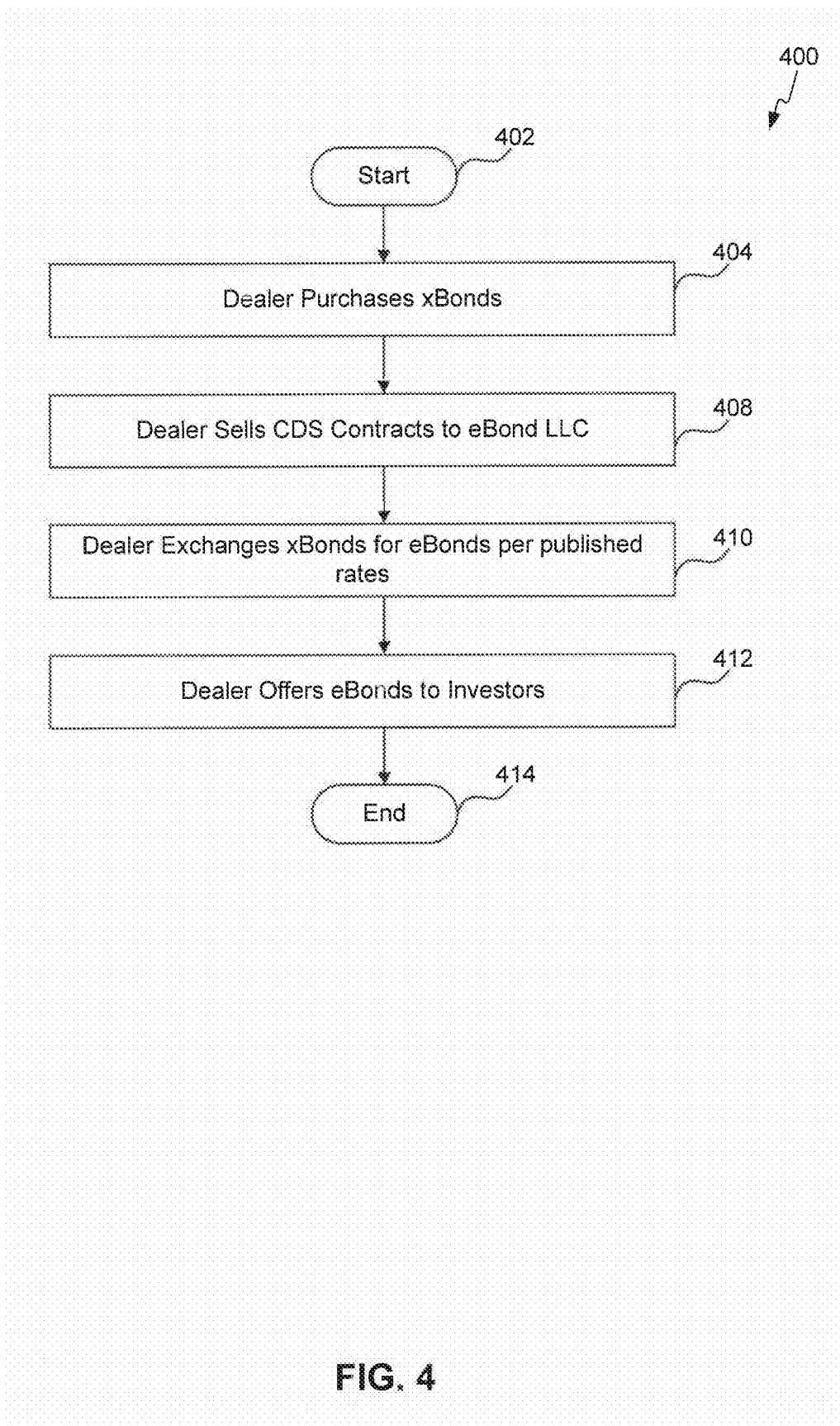
FIG. 4 is a flowchart illustrating steps by which a dealer is able to exchange xBonds for eBonds, in accordance with an embodiment of the present invention.

Continuing the previous non-limiting exemplary view of xBond 202 creation, dealer's 104 transactions are now described. FIG. 4 is a flowchart 400 illustrating steps by which a dealer 104 is able to exchange xBonds 202 for eBonds 206, in accordance with an embodiment of the present invention. One skilled in the relevant arts will recognize, as previously noted, that each entity discussed herein may represent a number of different actors, and the exchanges can be performed on a trading platform that permits trading based on the requirements provided by the bond indenture and published exchange requirements.

The method begins at step 402 and proceeds to step 404 where dealer 104 purchases xBonds 202 from bond issuer 102, in accordance with an embodiment of the present invention. As previously noted, and as will be recognized by one skilled in the relevant arts, dealer 104 may, in a non-limiting embodiment, represent one or more dealers 104 perhaps forming a syndicate for the purpose of purchasing issued xBonds 202. However, continued reference to dealer 104 as a single entity is made by way of example, and not limitation.

At this point, dealer 104 is free to offer xBonds 202 to investors 112 as with any other bond issued by bond issuer 102. However, as xBond 202 is not directly backed by a CDS 204 unless first exchanged into an eBond 206, the previous limitations regarding which investors 112 may purchase xBond 202 apply. For example, high grade investors may not have the option of purchasing a poorly rated xBond 202.

Accordingly, dealer 104 may wish to perform the exchange for some or all xBonds 202 into eBonds 206 in order to offer some level of default protection. In order to be able to initiate the exchange for eBonds 206, dealer 104 sells one or more CDS contracts to eBond LLC 109 as specified in the bond indenture at step 408, in accordance with an embodiment of the present invention. eBond LLC 109 uses these CDS contracts 204 as collateral for eCDS contracts which are issued to bond indenture trustee 103 for the benefit of investors in eBonds 206.

The eCDS contracts allow eBond LLC 109 to meet its obligations to the bond indenture trustee 103 under the requirements of the bond indenture, in accordance with an embodiment of the present invention. As will be discussed further below, the eCDS contract provides the security of underlying CDS contracts 204 without the need to pass CDS contracts 204 directly to bond indenture trustee 103. This solution avoids the need for bond indenture trustee 103 to mire itself in the details of fluctuating CDS contract valuations, for example, and provides a single instrument which specifies the precise protection provided by a particular eBond.

In accordance with an embodiment of the present invention, an exemplary CDS contract 204 has zero up-front cost, although one skilled in the relevant arts will understand to apply the following calculations for other up-front costs for other example CDS contracts 204. In a non-limiting example, which will be referred to throughout this disclosure, CDS contract 204 is priced at 100 basis points (i.e., 1% coupon) for a five year period. Over this five year period, the total cost of CDS contract 204 will therefore be 5% of the amount protected by CDS contract 204 in the event of default on secured xBond 202. One skilled in the relevant arts will appreciate that the specifics of a CDS contract 204 may vary, and the aforementioned values are provided as a non-limiting example. By way of example, and not limitation, a CDS contract 204 may have an additional upfront cost.

With an exemplary CDS contract 204 having no upfront cost, dealer 104 may sell CDS contract 204 to eBond LLC 109 at no upfront cost. eBond LLC 109 then has the responsibility for making the above-referenced coupon payments on the CDS contract, in accordance with an embodiment of the present invention. In exchange, CDS contract 204 secures a principal payout should bond issuer 102 default on repayment of xBond 202.

The bond coupon payments are paid directly to bond indenture trustee 103 by corporate bond issuer 102. Bond indenture trustee 103 distributes these payments directly to bondholders (e.g., investors 112).

With eBond LLC 109 now holding CDS contract 204, dealer 104 exchanges xBonds 202 for eBonds 206 at step 410 per the stipulations of the bond indenture and in accordance with exchange rates published by eBond facilitator 110, in accordance with an embodiment of the present invention. The price of an eBond 206 is reflected by the discounted price of xBond 202 plus the total cost of CDS contract 204. As noted above, for a five year CDS contract 204 with a 1% coupon, the total CDS contract 204 cost is 5% of the notional principal amount. This additional cost is paid by dealer 104 to eBond LLC 109, and is held by eBond LLC 109 to pay for the coupon payments on the CDS contract, in accordance with an embodiment of the present invention. In accordance with a further embodiment of the present invention, the holdings of eBond LLC 109 are placed in an account monitored by bond indenture trustee 103 for compliance with the terms of the bond indenture.

For the purposes of this non-limiting example, the notional principal amount of CDS contract 204 corresponds to the par value of xBond 202, in accordance with an embodiment of the present invention. In this example, the OID of xBond 202 is equivalent to the total cost of CDS contract 204, or 5%. Therefore, the discounted value of xBond 202 is 95% of par value. Dealer 104 provides the cost of CDS contract 204 and tenders xBonds 202 to eBond 109 in exchange for eBonds 206, in accordance with an embodiment of the present invention.

In order to secure this transaction to bond indenture trustee's 103 satisfaction, eBond LLC 109 provides an eCDS contract to bond indenture trustee 103, in accordance with an embodiment of the present invention. As discussed above, the eCDS contract is backed by the CDS contracts held by eBond LLC 109, and provides a way by which bond indenture trustee 103 can recover losses on behalf of bondholders. The eCDS contract is a bilateral agreement between eBond LLC 109 and bond indenture trustee 103 without involvement of CCP 108, in accordance with an embodiment of the present invention.

The dealer 104 is now able to take eBonds 206 directly to market and sell them to investors 112 at step 412. eBonds 206 from the above non-limiting exemplary transaction are "default-free" bonds termed "e-100" eBonds 206, the "100" meaning they cover 100% of the par value of underlying xBonds 202 in the event of default by bond issuer 102. The term "default-free" in this sense refers to the 100% coverage in the event of default. The aforementioned eCDS contract specifies the level of coverage provided by the particular eBond tranch. For example, the eCDS contract for an "e-100" eBond 206 can specify a default condition for anything less than 100% of payments made, including principal and interest, on the bond. The eCDS contract for an "e-80" eBond 206 can specify a default condition where bond issuer 102 is unable to repay the principal, and provides coverage of 80% of the principal payment. One skilled in the relevant arts will appreciate that other levels of risk and protection can be provided. The method then ends at step 414.

In accordance with a further embodiment of the present invention, the conversion process occurs between tranches of eBonds 206, or back to xBonds 202. For example, a dealer 104 may exchange an "e-80" eBond 206 for an "e-100" eBond 206 by selling the required CDS contract 204 to eBond LLC 109, and making a cash payment to eBond LLC 109 to cover the difference in cost. In an exemplary conversion from an "e-100" eBond 206 to an xBond 202, dealer 104 receives cash based on the stipulated method of the eBond facilitor from eBond LLC 109 and receives the stipulated amount of CDS contracts.

When the requirements for a particular conversion are met (e.g., from xBond 202 to a particular eBond 206 tranch, between eBond 206 tranches, or from an eBond 206 back to an xBond 202), eBond LLC 109 notifies bond indenture trustee 103 of the requested conversion. Bond indenture trustee 103 then performs the actual conversion, effectuating an exchange from a CUSIP number unique to the xBond 202 or particular eBond 206 tranch and another CUSIP number corresponding to the desired bond.

E-100 bonds created in this manner would have excellent creditworthiness, based on the backing provided by CDS contract 204 and secured by the creditworthiness of CCP 108. This allows investors to purchase a standard bond with low or no default risk, thereby increasing the likelihood that bond issuer 102 can find a purchaser for the bonds.

In the above non-limiting exemplary embodiment, the price of xBond 202 was determined based on an assumption of an eBond 206 price at 100% par value and a total CDS cost of 5%. As will be described below, an eBond facilitator 110 may offer a number of different exchanges based on the precise level of default protection investors wish to receive. The various levels of protection are offered as different tranches of an eBond 206, including the above-referenced e-100 default-free bond, and other levels such as, by way of example, and not limitation, e-90 and e-80. In accordance with a further embodiment of the present invention, e-100 bonds are further fully protected for any interest payments.

The discount at which bond issuer 102 must offer original xBond 202 for sale is tied to the price of CDS contracts 204 securing the bond. More precisely, as a bond issuer's 102 credit rating declines, and issued bonds are considered more speculative in nature, the cost of a CDS contract 204 will generally trend upward. As the creditworthiness of a bond issuer 102 increases, CDS contracts 204 backing the bond will generally decrease in cost. The implications of this on the OID price of xBonds 202 are discussed below.

Figure 5:
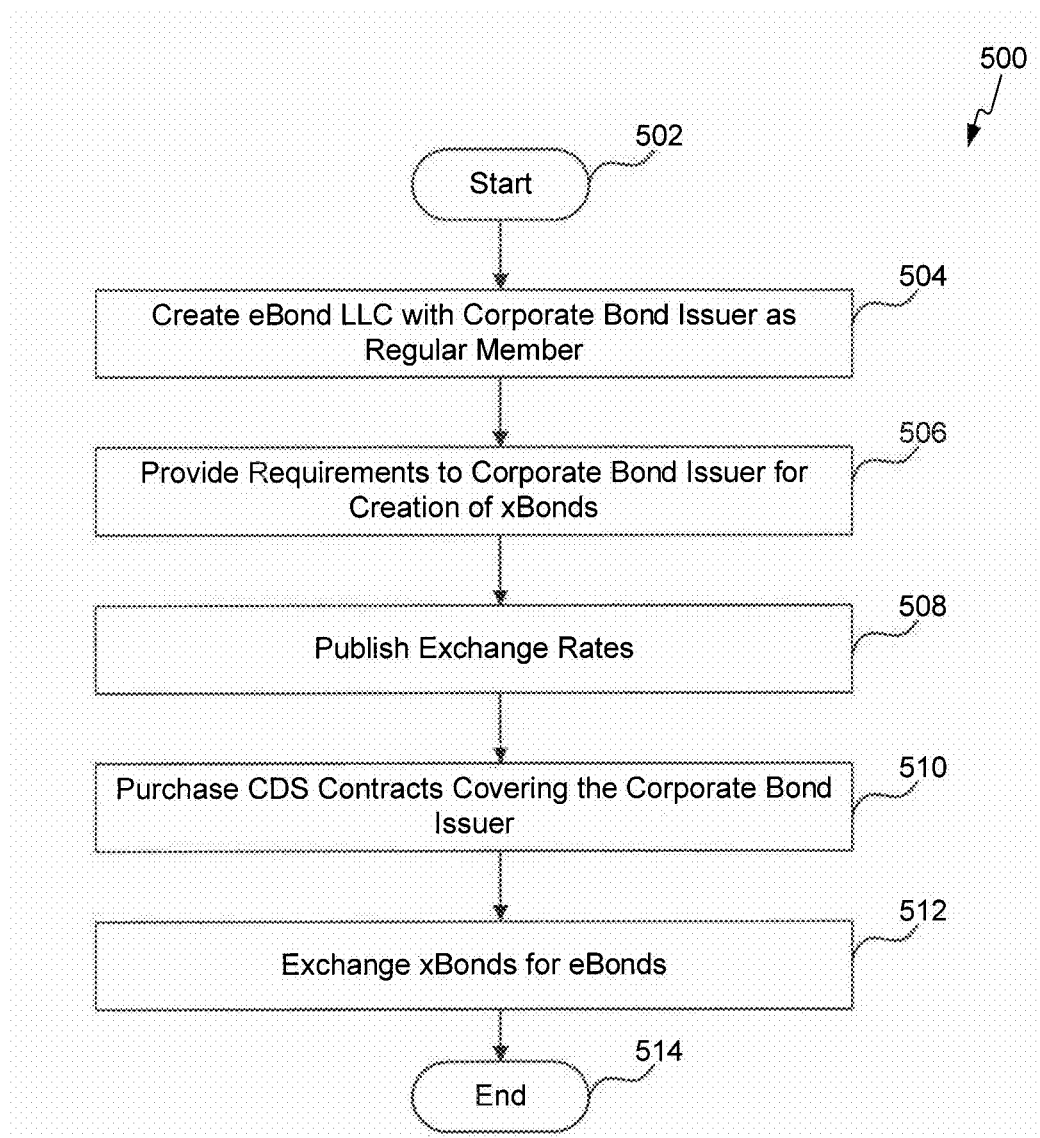
FIG. 5 is a flowchart illustrating steps by which an eBond facilitator facilitates the eBond exchange process, in accordance with an embodiment of the present invention.

FIG. 5 is a flowchart 500 illustrating steps by which eBond facilitator 110 facilitates the eBond 206 exchange process, in accordance with an embodiment of the present invention. The method begins at step 502 and proceeds to step 504 where an eBond LLC 109 is formed with bond issuer 102 as a regular member, in accordance with a further embodiment of the present invention.

In accordance with an additional embodiment of the present invention, one or more financial advisors, such as eBond facilitator 110, take on the role of managing member (s) of eBond LLC 109, charged with the task of controlling assets (e.g., CDS contracts 204 and cash) in a manner which maintains bankruptcy remote status for the benefit of investors. Bond issuer 102, in its role as a regular member, is required to meet any CDS variation margin calls, if applicable, from CCP 108 and any other payments that are required by the terms of the eBond LLC 109. In particular, bond issuer 102, in its role as regular member of eBond LLC 109, is subject to capital calls at a later date, which allows eBond LLC 109 to always have enough cash on hand to pay accrued interest on the eBond 206. This allows eBond facilitator 110, in its role as managing member of eBond LLC 109, to maintain bankruptcy remoteness.

The method continues at step 506 where requirements are provided as part of the agreement forming eBond LLC 109 regarding applicable parameters for creation of xBonds 202, in accordance with an embodiment of the present invention. As previously discussed, in a non-limiting exemplary embodiment these parameters include a specified date on which any issued xBonds 202 must mature. In a further exemplary embodiment these parameters include a particular CDS contract 204 which is provided by a dealer 104 to eBond LLC 109 as part of the exchange process. These requirements are included in the bond indenture for xBond 202.

At step 508, eBond facilitator 110 publishes exchange rates for eBonds 206, in accordance with an embodiment of the present invention. As previously discussed, this rate will vary with the cost of CDS contracts 204 on the underlying xBond 202, in accordance with a further embodiment of the present invention.

First, eBond facilitator 110 determines the OID price at which xBond 202 should issue, in accordance with an embodiment of the present invention. This is computed by subtracting the costs of a CDS contract 204 on the underlying xBond 202 from the 100% "default-free" protection (i.e., backed by CCP 108) of an e-100 eBond 206. The cost of a CDS contract 204 is determined by adding any upfront costs together with the coupons over the life of CDS contract 204, in accordance with an embodiment of the present invention. The precise amounts of CDS contract 204 costs are determined by calculations which are well-known to those skilled in the relevant arts using industry standard CDS calculations.

As a non-limiting example, assume a bond issuer 102 wishes to issue an xBond that, when exchanged into an e-100 eBond 206, is priced at 100% par value with a yield of 2.75% over five years. In this non-limiting example, a CDS contract 204 for the same five year period can be purchased for 200 basis points with a 1% coupon. The total cost of this exemplary CDS contract 204 is therefore 5% (5 years at 1% coupon) plus the remaining upfront cost associated with the 200 basis point CDS pricing. In this case the upfront cost is calculated to be 4.42%, using industry standard CDS calculations. The total cost of CDS contract 204 over the five year period would therefore be 9.42%.

In accordance with an embodiment of the present invention, bond issuer 102 will need to issue an xBond 202 with a price discounted to 90.58% of par value (100% par value for the e-100 eBond 206 minus the 9.42% total cost of CDS contract 204) and a 4.90% yield. For other tranches of eBonds 206, backing CDS contract 204 covers a reduced liability (e.g., 80% par value for an e-80 eBond 206), in accordance with an embodiment of the present invention. eBonds can be exchanged for eBonds of other tranches, as well as reverted to xBonds, by calculating the delta of the value of CDS contracts 204 of the two instruments and the delta of the prices of the bonds. The total of these cost differences is calculated, and the exchange is made between dealer 104 and eBond issuer 110, with a cash payment made to the appropriate entity based on the differences in value. This exchange rate can also be used to exchange xBonds 202 directly for a particular tranche, such as an e-80 eBond 206.

In accordance with an embodiment of the present invention, eBond facilitator 110 collects fees from bond issuer 102 at the time of issuance for the service of managing the initial eBond 206 offering, such as through the publication of exchange rates determined through the above calculations, and for the ongoing maintenance of the eBond LLC 109 mechanisms. In a non-limiting exemplary embodiment, eBond facilitator 110 adds on a 5 basis point fee at the time of offering. In accordance with a further embodiment of the present invention, eBond facilitator 110 collects an exchange fee from dealer 104 at each exchange. For example, eBond facilitator 110 may assess a tee of $50 for each $1 M worth of eBonds exchanged through the aforementioned processes. One skilled in the relevant arts will recognize that other means for monetizing the initial offering and ongoing exchanges may be employed, and the aforementioned means are provided by way of example, and not limitation.

At step 510, eBond LLC 109 purchases the aforementioned CDS contracts 204 from dealer 104, as previously discussed. This allows eBond LLC 109 to provide the required eCDS contract to bond indenture trustee 103, backed by CDS contracts 204, thereby allowing dealer 104 to exchange xBonds 202 into eBonds 206 at step 512 per the terms of the bond indenture. The method ends at step 514.

In accordance with an embodiment of the present invention, eBond facilitator 110 conducts the aforementioned transactions through bond indentured trustee 103, such as the previously mentioned exchange of CUSIP numbers.

Figure 6:
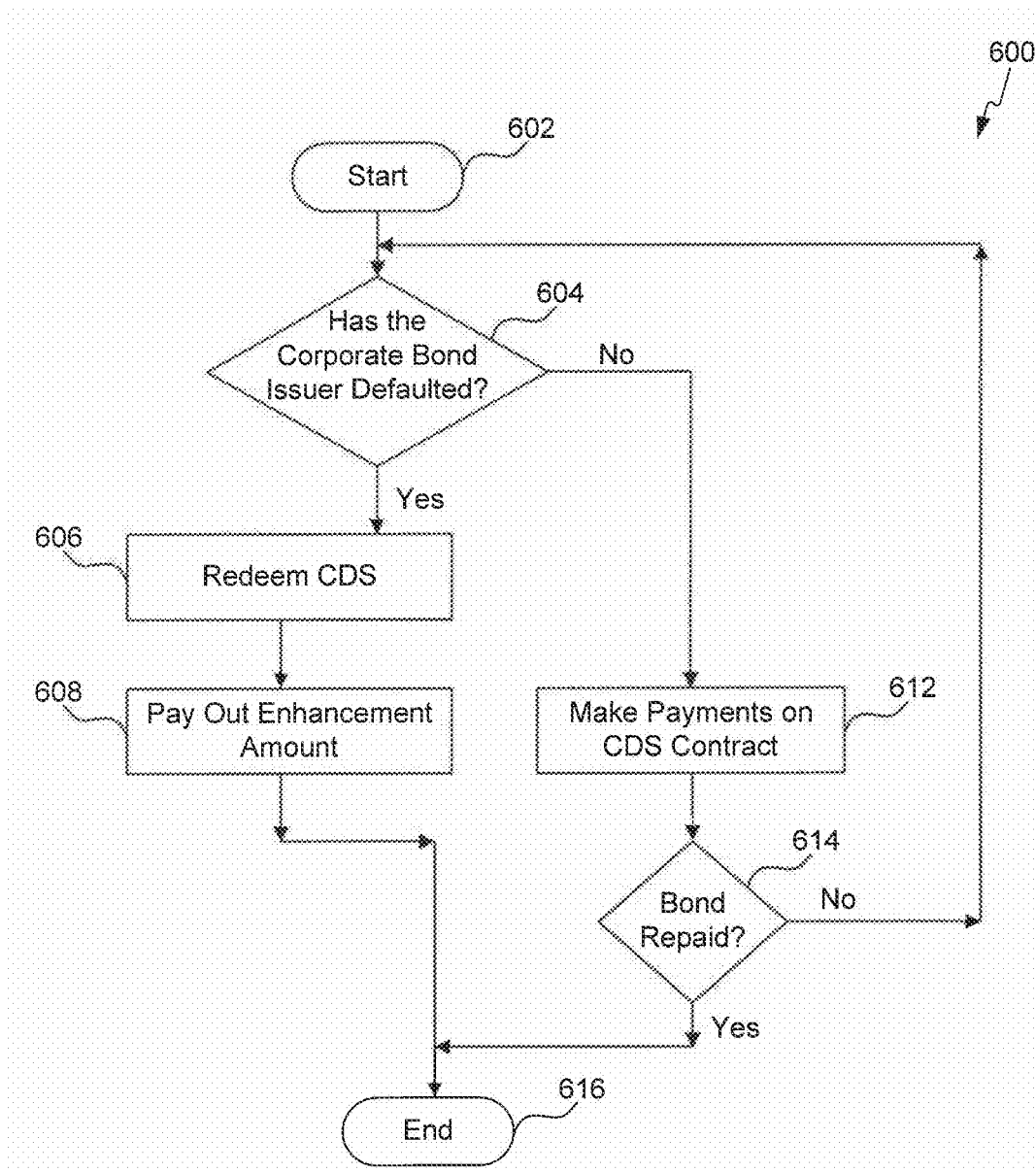
FIG. 6 is a flowchart illustrating a course of performance by an eBond LLC, in accordance with an embodiment of the present invention.

FIG. 6 is a flowchart 600 illustrating a course of performance by eBond LLC 109, in accordance with an embodiment of the present invention. The method begins at step 602 and proceeds to step 604 where a determination is made as to whether bond issuer 102 has defaulted on obligations on the underlying xBond 202. If not, then this means that any coupon payments due are being timely paid by bond issuer 102 to bond indenture trustee 103 for distribution to bondholders. At step 612, eBond LLC 109 uses cash reserves acquired from the initial exchange to make any coupon payments on CDS contract 204.

At step 614, a determination is made as to whether the full amount of xBond 202 has been repaid, and if not, the method begins anew at step 604. If xBond 202 has been repaid, then all party obligations are fulfilled, and the method ends at step 616. In this event, in accordance with an embodiment of the present invention, eBond LLC 109 returns any residual cash to bond issuer 102, per the terms of the eBond LLC membership agreement, such as funds used to protect against a CDS contract 204 call.

If, instead, bond issuer 102 has defaulted on obligations to repay xBond 202, then the eCDS and underlying CDS contracts 204 become redeemable. At step 606, bond indenture trustee 103 notifies investors that all outstanding eBonds are being called for early redemption. The eBonds are then delivered by investors to bond indenture trustee 103, who converts the eBonds back to xBonds with them together with the eCDS contract to eBond LLC 109 for redemption. In turn, the underlying CDS contracts are delivered, together with the xBonds, to the CDS contract issuer (e.g., dealer 104).

The redemption amount of the CDS contracts (e.g., par plus accrued interest in the case of e-100 eBonds, or 80% par in the case of e-80 eBonds) is received by bond indenture trustee 103 for the benefit of, and distribution to, affected bondholders.

One skilled in the relevant arts will recognize that settlements may take place that eliminate the need for one or more of the aforementioned deliveries of bonds and contracts. For example, bond indenture trustee 103 may hold the underlying CDS contracts in trust, and may therefore be able to redeem them directly without first delivering the eCDS contract. Moreover, dealer 104 that acted as principal for the underlying CDS contracts may not want to take delivery of the defaulted xBonds, and instead may simply pay out the CDS contract amount per a settlement agreement. One skilled in the relevant arts will recognize that many different ways of handling the aforementioned exchanges may exist, and are all contemplated within the scope of the present invention.

At step 608, eBond issuer 110 pays out the amount secured by eBond 206 vehicles it has issued, such as 90% par value for an e-90 eBond 206, or 100% par value plus interest for an e-100 eBond 206 (i.e., principal and interest guaranteed bonds), using the funds obtained from redemption of the CDS contract 204 and with cash held by eBond LLC 109. The method then ends at step 616.

Figure 7:
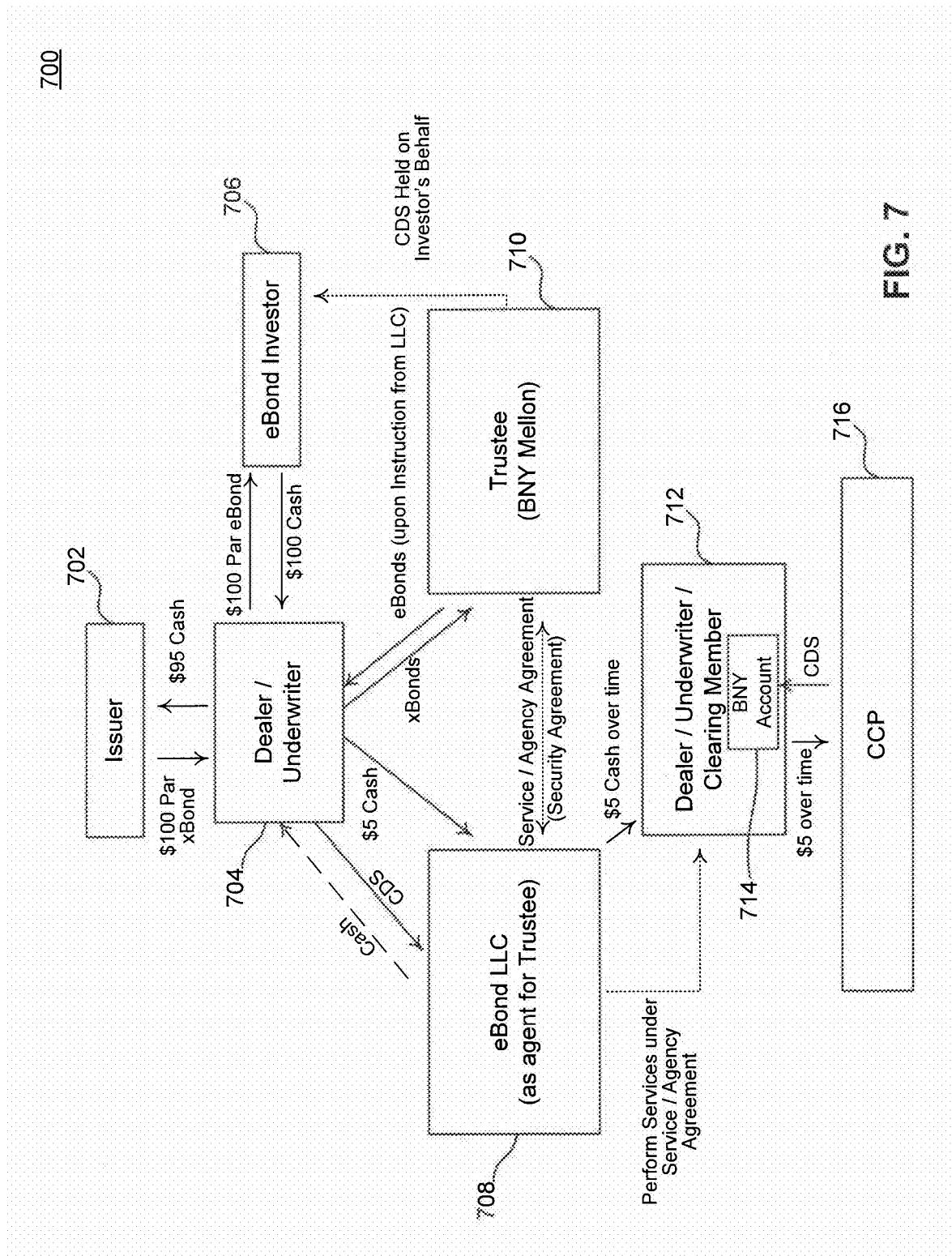
FIG. 7 is a diagram illustrating components of a further eBond exchange, in accordance with an embodiment of the present invention.

In accordance with an embodiment of the present invention, the purchase of an eBond by an eBond investor is facilitated without the use of an eCDS. FIG. 7 is a diagram 700 illustrating components of a further eBond exchange, in accordance with an embodiment of the present invention.

As before, a corporate bond issuer (or other bond-issuing entity) 702 provides an OID xBond to a dealer/underwriter 704, in accordance with an embodiment of the present invention. As shown in FIG. 7, in an exemplary non-limiting embodiment, this exchange involves the issuance of a $100 par value xBond for a discounted $95 cash. An eBond investor 706 then pays $100 for a $100 par eBond based on this xBond and backed by a CDS.

An eBond LLC 708 handles the purchasing of a backing CDS and compliance with requirements of CCP 716 and clearing member 712, in accordance with an embodiment of the present invention. As before, for the purposes of the discussion herein, actions taken by, or on behalf of, eBond LLC 708 are generally discussed in the context of an eBond facilitator in its role as managing member. Moreover, although the present description will refer to an LLC corporate structure, one of skill in the relevant arts will recognize that corporate structures other than an LLC may also be created without departing from the spirit and scope of the present invention.

With all of the requirements for the xBond-to-eBond exchange met, trustee 710 performs the exchange with dealer/underwriter 704 upon instruction by eBond LLC 708, in accordance with an embodiment of the present invention. The eBond can then be delivered to eBond investor 706.

Figure 8:
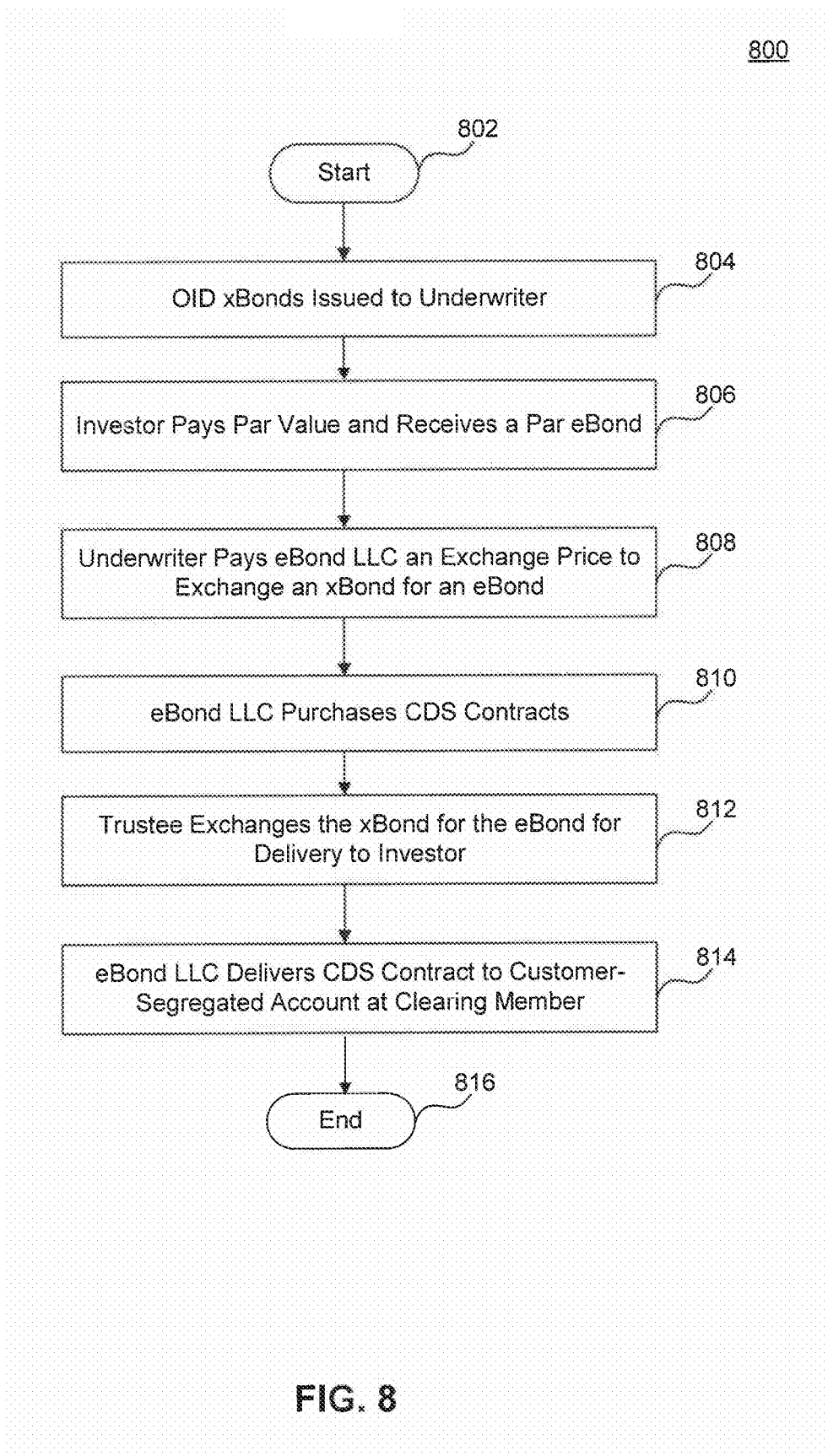
FIG. 8 is a flowchart illustrating steps by which an immediate xBond-to-eBond exchange is effected, in accordance with an embodiment of the present invention.

FIG. 8 is a flowchart of a method 800 illustrating steps by which an immediate xBond-to-eBond exchange is effected, in accordance with an embodiment of the present invention. Method 800 is discussed with ongoing reference to diagram 700 of FIG. 7. The method begins at step 802 and proceeds to step 804 where OID xBonds are issued by issuer 702 to a dealer/underwriter 704, in accordance with an embodiment of the present invention. As shown in the non-limiting example of FIG. 7, dealer 704 may pay $95 in exchange for each $100 par xBond from issuer 702. One skilled in the relevant arts will recognize that the discount amount may vary, as previously discussed.

The method then proceeds to step 806, where investor 706 pays the par value for an eBond (e.g., e-100 tranch eBond) in exchange for the eBond, in accordance with an embodiment of the present invention. In the exemplary non-limiting embodiment of FIG. 7, this exchange includes a $100 payment from investor 706 to dealer 704 in exchange for a $100 par eBond. Although both payment and receipt of the eBond can occur simultaneously or nearly-simultaneously from the perspective of eBond investor 706, a number of additional steps take place before the eBond delivered to investor 706 is created, in accordance with an embodiment of the present invention.

At step 808, dealer/underwriter 704 pays eBond LLC 708 an exchange price to effect the exchange of an xBond for an eBond. In the exemplary non-limiting embodiment shown in FIG. 7, this is a $5 payment from dealer 704 to eBond LLC 708. eBond LLC 708 purchases CDS contracts at step 810, which are used to back the eventual eBond, and thereby allow for exchange of the xBond to an eBond, in accordance with an embodiment of the present invention. In accordance with a further embodiment of the present invention, eBond LLC 708 purchases the CDS from dealer 704, but one skilled in the relevant arts will recognize that this purchase may be made from any other CDS dealer.

With the CDS acquired by eBond LLC 708, the requirements for creation of an eBond are met, in accordance with an embodiment of the present invention. eBond LLC 708 instructs trustee 710 to exchange the xBonds for eBonds at step 812, effectuating this exchange with dealer 704. This exchange allows dealer 704 to deliver the eBonds (e.g., $100 par eBonds per the non-limiting example of FIG. 7) to investor 706.

At step 814, in order to secure the CDS with a clearing member, eBond LLC 708 delivers the CDS contracts it holds to trustee 710 or other fiduciary for placement in a customer account, in accordance with an embodiment of the present invention. In accordance with a further embodiment of the present invention, this customer account 714 is associated with investor 706, and is held with a clearing member 712 at a CCP 716. eBond LLC 708 makes the CDS coupon payments to the clearing member 712 or CCP 716 in compliance with a CDS servicing agreement, in accordance with a further embodiment of the present invention. The method then ends at step 816.

In accordance with an embodiment of the present invention, dealer/underwriter 704 and dealer/underwriter/clearing member 712 may be the same or separate entities. Customer account 714 is held, in accordance with a further embodiment of the present invention, by trustee 710 or other fiduciary in its role as trustee, on behalf of investor 706.

In accordance with an embodiment of the present invention, eBond LLC 708 holds enough cash such that, in the event of a default, all CDS coupons can be paid and the last bond interest can be paid. By way of non-limiting example, e-100 tranch eBonds, as previously discussed, are principal and interest guaranteed bonds. Therefore, eBond LLC 708 must be able to pay all CDS coupons in the event of a default in order to recover on the CDS contracts. Typically, if CDS coupons are not paid, the CDS is terminated with no principal paid, although one skilled in the relevant arts will understand that the particulars depends on the precise nature of the CDS contract.

An eBond Reserve Account Formula is used to compute the minimum required cash reserves at any time, in accordance with an embodiment of the present invention. These minimum cash reserves, in accordance with an embodiment of the present invention, are equal to one CDS coupon plus one-and-a-half bond coupons. As a result, the initial cash held in eBond LLC 708 is equal to the CDS exchange price (upfront CDS costs plus future CDS coupons), but is simultaneously reduced by the upfront CDS cost based on the need for eBond LLC 708 to purchase a CDS contract, leaving the future CDS coupons, in accordance with a further embodiment of the present invention.

Over time, eBond LLC 708 pays out the CDS coupons, as discussed above, which reduces cash reserves, in accordance with an embodiment of the present invention. If cash reserves are reduced below the minimum required, as determined in a non-limiting exemplary embodiment by the eBond Reserve Account Formula, then the managing member of eBond LLC 708 (e.g., eBond facilitator 110 of FIG. 1) initiates a capital call to the regular member of eBond LLC 708 (e.g., issuer 702) for additional cash reserves, in accordance with an embodiment of the present invention. In accordance with an additional embodiment of the present invention, for bankruptcy purposes, issuer 702, as a regular member of eBond LLC 708, has no access to cash reserves except at time of bond retirement.

III. Multi-Obligor Securities Generally

The aforementioned embodiments describe, among other things, the formation of an eBond by way of combining a credit default swap contract on a single obligor (e.g., a single corporate entity) with a debt security (e.g., a corporate bond) from the same single obligor. This symmetry is in place to match the CDS and debt of a common obligor on a one-to-one basis. As described herein, these techniques are extended to include multi-obligor CDS contracts with matching multi-obligor securities. This extends the one-to-one relationship of the eBond instrument to many-to-many instruments. In accordance with an embodiment of the present invention, this flexible instrument is termed an "eInstrument," where an eBond is a particular type of eInstrument.

In accordance with an embodiment of the present invention, an eInstrument is not limited to single obligors such as a corporation or governments. Instead, several other debt types may be credit enhanced by joining cash obligations with matching CDS contracts. These additional uses are contemplated by this disclosure.

The disclosure describes these new eInstrument instruments by way of an exemplary non-limiting specific new instrument termed an "eMBS" or "enhanced mortgage backed security." Where specific reference to an eMBS is made, one skilled in the relevant art will appreciate that other multi-obligor securities can be utilized instead of a mortgage backed security.

IV. Mortgage Backed Securities

A mortgage backed security, or MBS, is essentially a "pass-thru" vehicle that aggregates multiple mortgage obligors into mortgage "pools." Pooling is achieved, by way of non-limiting example, by specifying that each pool be composed of mortgage loans that fall within narrow and well-defined parameters. Parameters may include, by way of non-limiting example, coupon, final maturity, geographic region, and loan size. The pools are then used to collateralize the MBS, which may then be sold to investors around the world. The market for mortgage backed securities is measured in the trillions of dollars.

Servicing the mortgages pooled in an MBS is handled by an MBS servicing agent, in accordance with an embodiment of the present invention. Each month, the master MBS servicing agent (typically the Federal Home Loan Mortgage Corp ("FHLMC" or "Freddie Mac"), Federal National Mortgage Association ("FNMA" or "Fannie Mae"), or Government National Mortgage Association ("GNMA" or "Ginnie Mae")) collects principal and interest payments from individual mortgage servicers, such as private companies or banks. After taking a fee, the master MBS servicing agent remits the collection proceeds directly to the MBS holders.

In accordance with an embodiment of the present invention, individual mortgage obligors may pay off their mortgage prior to maturity, pre-pay their mortgage through refinancing or property sale, or make regular payments until the balance is paid off, given the normal course of performance of individual mortgage contracts in the MBS pool. The outcome of these events is "passed-thru" to the MBS investor. For example, an obligor paying off their mortgage prior to maturity means the MBS investor will receive a corresponding portion of the proceeds, and will not receive any further interest payments for that portion of the MBS pool.

In the event of a defaulting obligor, most mortgages are pre-paid by a range of third-party guarantors, ranging from private insurers to the Federal Government. In an exemplary non-limiting embodiment, the MBS investor receives a pre-payment from the guarantor, and the guarantor assumes the responsibility for disposing of the loan or mortgage collateral. Typically, the actual loss incurred by the guarantor does not exceed 50% of the remaining loan value, based on recovery for disposing of the loan or mortgage collateral.

V. Enhanced Mortgage Backed Securities

Using the aforementioned eInstrument, it is possible to create an enhanced mortgage backed security, or eMBS. As with eBonds above, an eMBS can be offered in tranches (e.g., e100, e90, etc.) that provide a particular level of principal protection. For example, an e100 MBS would provide 100% principal protection, an e90 MBS would provide 90% principal protection, and so on. One skilled in the relevant arts will appreciate that other naming conventions may be utilized. Consequently, an eMBS with zero principal protection can also be offered and purchased, offering no credit enhancement with higher yields, but a higher default risk profile.

An eMBS operates in a similar manner as a traditional MBS, except an eMBS is exchangeable into like-securities that have been credit-enhanced by a matching MBS CDS, in accordance with an embodiment of the present invention. Credit default swaps issued to back mortgage backed securities exist and are offered for purchase, and any standard or non-standard CDS vehicle backing a MBS can be utilized for this purpose. According to an embodiment, a new MBS CDS contract is determined based on several characteristics, described herein.

In accordance with an embodiment of the present invention, the MBS CDS contract has a stated expiration date based on the longest maturity date of any mortgage loan in the related MBS pools. Additionally, the MBS CDS has a standard coupon rate (e.g., 0.50%) that varies based on the type of MBS, such as the loan quality, region, maturity, loan type, etc. of the MBS. The MBS CDS may also be quoted using basis points, as with a regular CDS, in accordance with a further embodiment of the present invention. Upfront payments for the MBS CDS can be determined using a standard CDS calculator, which may require prepayment input similar to an MBS calculator.

In accordance with an embodiment of the present invention, rather than a Mortgage Guarantor such as Freddie Mac or Fannie Mae being solely liable for paying out the full principal balance to an MBS holder due on a credit event (a triggering action for the CDS, such as a default or specified late status), the MBS CDS seller will pay a specified percentage of the principal balance that was defaulted on either to the MBS Guarantor or the eMBS indenture trustee. One skilled in the relevant arts will appreciate that other MBS CDS payout options may be utilized, and are contemplated within the scope of this disclosure. The MBS CDS seller would have no residual interest in either the loan or the underlying collateral, in accordance with an embodiment of the present invention.

VI. Enhanced Mortgage Backed Security Transactional Flow

Figure 9:
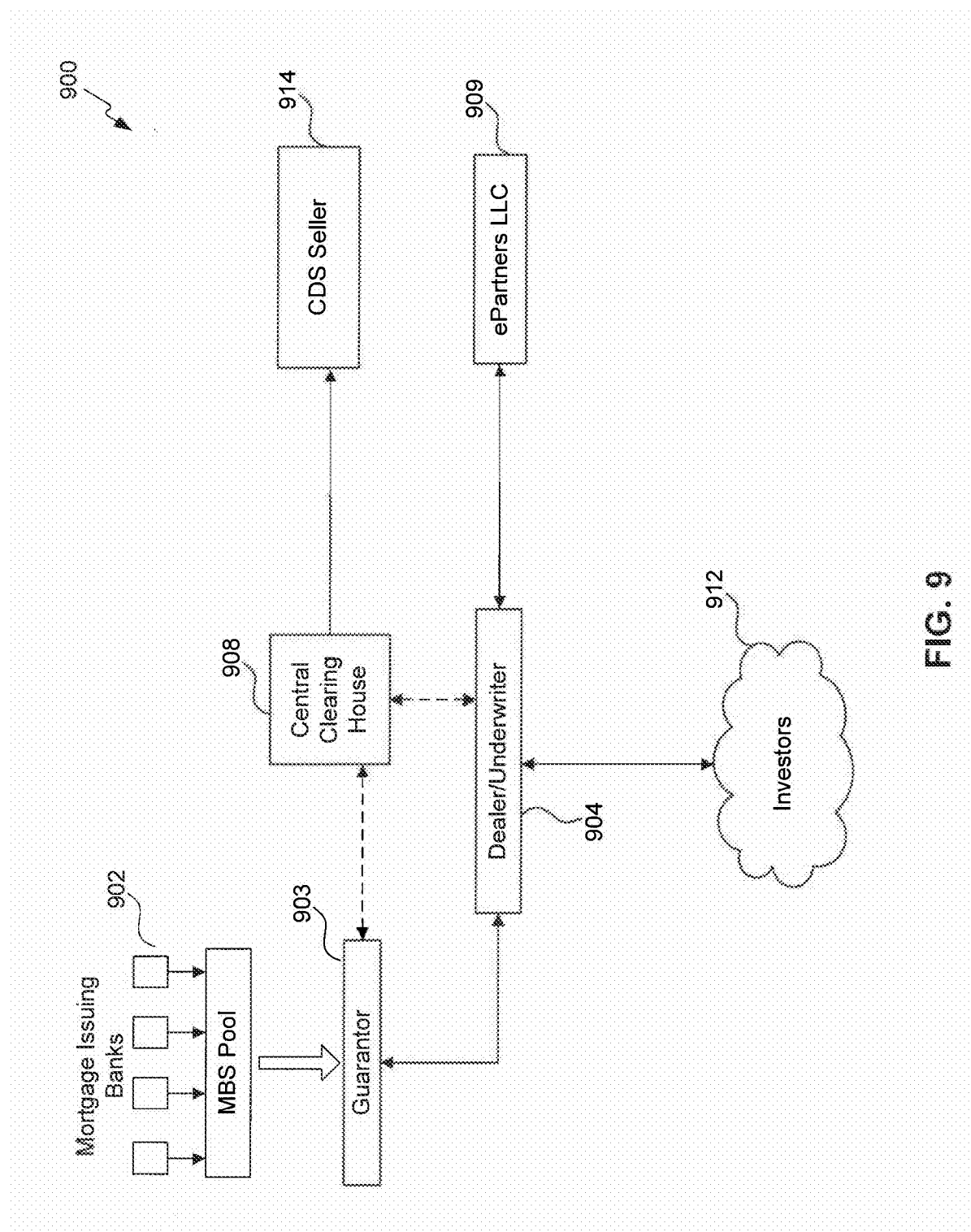
FIG. 9 is a diagram illustrating the interactions between financial entities involved in the creation of an eMBS, in accordance with an embodiment of the present invention.

FIG. 9 is a diagram 900 illustrating the transactional flow for the creation and issue of an eMBS, in accordance with an embodiment of the present invention. As can be seen by comparison to diagram 100 of FIG. 1, the transactional flow is similar to that of an eBond. In contrast, however, the buyer or holder of the MBS CDS may be either the eMBS indenture trustee, a government guarantor (e.g., Freddie Mac), or a private guarantor (a private loan originating and servicing bank).

As shown in FIG. 9, one or more banks 902 issue mortgages to mortgage obligors. These mortgages are then pooled, and a mortgage backed security representing the pool is created, in accordance with an embodiment of the present invention. As shown in FIG. 9, a guarantor 903 (e.g., Freddie Mac, or a private guarantor) may handle pooling the mortgages and issuing the MBS. As with eBonds, an MBS indenture trustee (possibly separately from obligor 903 or the same) creates an MBS indenture that meets the requirements of an exchangeable MBS.

An investor 912 is able to buy an unenhanced MBS (also termed an xMBS for "exchangeable MBS," consistent with the above discussion of xBonds) or enhanced MBS (e.g., e100 MBS). These purchases are made through a dealer 904, in accordance with an embodiment of the present invention. In accordance with a further embodiment of the present invention, dealer 904 is authorized to sell the eMBS by guarantor 903, such as Freddie Mac.

In order to fulfill a request to purchase an e100 MBS, the dealer 904 requests an MBS to e100 MBS exchange by selling guarantor 903 or the MBS indenture trustee an MBS CDS (such as the aforementioned MBS CDS) that matches the eMBS being offered in the exchange, in accordance with an embodiment of the present invention. By way of non-limiting example, this process may occur in a primary market during initial settlement and allocation, providing new issuance of eMBS investment vehicles, or in the secondary market using prior-issued mortgage backed securities. As shown in FIG. 9, the MBS CDS is sold by CDS seller 914, who may be a third party or dealer for its own account, but the sale to guarantor 903 is handled by dealer 904, in accordance with an embodiment of the present invention. In this embodiment, the agreement between dealer 904 and CDS seller 914 is novated to guarantor 903, such that the counterparties to the MBS CDS contract are the guarantor 903 and CDS seller 914. In accordance with a further embodiment of the present invention, this transaction is handled through central clearing house 908, such that guarantor 903 and CDS seller 914 are each counterparties to a central counterparty, the central clearing house 908.

In accordance with a further embodiment of the present invention, ePartners LLC 909 facilitates these transactions by confirming the characteristics of the MBS CDS and the eMBS match as well as requirements of an MBS CDS are compatible with the eMBS (e.g., the MBS CDS triggers on a credit event on a mortgage within the MBS pool of the eMBS).

During the normal course of performance, guarantor 903 pays the principal and interest to the eMBS indenture trustee exactly as if this were a regular MBS and guarantor 903 were acting as the obligor. In accordance with an embodiment of the present invention, this step is omitted if the guarantor and trustee are the same entity 903.

The trustee (or guarantor, if the same entity) makes coupon payments on the MBS CDS through the central clearing house 908 to CDS seller 914. This may be done, in accordance with an additional embodiment of the present invention, through dealer 904 if the MBS CDS contract has not been novated to guarantor 903. In the event of a mortgage obligor credit event (e.g., default), guarantor 903 or the eMBS indenture trustee collects a fixed payment from the MBS CDS seller through the central clearing house 908 and remits 100% of the remaining principal balance (or other specified guaranteed amount) to the eMBS investor 912 on the next monthly payment date, in accordance with an embodiment of the present invention. In this scenario, eMBS investor 912 has received payout as if the loan was refinanced or prepaid, or some portion thereof for any risk tranche lower than e100 MBS.

Subsequently, the guarantor 903 owns the residual interest in the loan and the underlying collateral, but has only paid the difference between 100% and the MBS CDS seller payment (e.g., 40%). In this example, guarantor 903 has only paid 60% of the loan value. Guarantor 903 can then dispose of the loan or underlying collateral property to recoup its 60% cost, in accordance with an embodiment of the present invention. This approach is described in further detail below.

By way of non-limiting example, suppose the principal balance on a particular mortgage in a mortgage pool of a mortgage-backed security is $100,000. A mortgage guarantor 903 may indicate to investors that they will guarantee the principal balance on the mortgages in the pool. Note that mortgage guarantor 903 may provide less than full guarantee, including no guarantee at all, shifting the risk to investors 912. Additionally, while in the case of government-backed guarantors 903 such as Fannie Mae or Freddie Mac, the U.S. government can fund guarantees with the power of the Treasury, private guarantors 903 will need to provide investors 912 with some confidence in their solvency and ability to provide the guarantee. In the case of government-backed guarantors 903, there is also an incentive to shift some of the risk to the private sector. Both of these situations are addressed, in accordance with an embodiment of the present invention, by the guarantor 903 purchasing a CDS covering the MBS.

Returning to the example mortgage, a guarantor 903 providing a full guarantee of the principal balance would have to make an investor 912 whole on the exemplary $100,000 principal balance in the event of a "credit event" (e.g., a default, coupon late beyond a certain number of days, etc.). As a result of such a credit event, the guarantor 903 would pay the investor 912 the principal balance owed on the mortgage, in this case $100,000. The guarantor 903 would recover on the MBS CDS from CDS seller 914.

The coverage provided by an MBS CDS sold by CDS seller 914 need not be the full principal amount. In particular, it is expected that the underlying collateral, or even the non-performing mortgage, would typically be worth around 60% of the principal balance. In this case, the MBS CDS would only need to cover 40% of the principal balance in order to make guarantor 903 whole. One skilled in the relevant arts will appreciate that the 40/60 split is provided by way of example, and not limitation. In this example, the guarantor 903 would receive $40,000 from CDS seller 914, and would sell the underlying collateral being mortgaged or the non-performing mortgage itself generally around 60% of the principal balance. It remains possible for the guarantor to make an overall profit on this transaction.

Note that while the above examples are discussed in the context of mortgages, other obligations can be utilized by way of similar example, as will be understood to one skilled in the relevant arts.

VII. Alternative Multi-Obligor Implementations

Today, bond funds are composed of debt issued by many different obligors. However, an inventive alternative implementation provides for the use of "eFunds" that are composed of bonds from multiple obligors. Unlike a bond fund, however, investors have the option of purchasing eShares in the eFund in one of several tranches, such as e100 eShares, e90 eShares, etc.

In contrast to investing in a bond fund, an e100 share owner would see their investment backed by a CDS, such that in the event of any bond default within the fund, the e100 share owner would see their e100 share value reflect 100% prepayment of the bond, rather than the defaulted bond value.

In accordance with an embodiment of the present invention, the backing CDS is a "Fund CDS" that matches the fund itself, rather than each individual fund holding having its own separate credit enhancement. As with eMBS, multiple obligors are aggregated into a single financial instrument (the eFund) that is matched with a CDS (the eFund CDS) that exactly references the obligors in the eFund.

The default process for eFunds composed of non-collateralized debt securities follows that described above with eBonds. In the case of collateralized debt obligations (e.g., Asset-Backed Security (ABS), Commercial Mortgage-Backed Security (CMBS), Mortgage-Backed Security (MBS), etc.), the default process follows from that described above with eMBS.

Other types of loans can be credit enhanced during the processes described above, and is not limited to bond funds or MBS. For example, banks and other lenders may wish to move even more loans off their balance sheets, such as car loans, credit card receivables, and other loans. These loan assets may be placed into "eLoanFund" vehicles or other special purpose vehicles funded by shares and/or debt securities. Such eLoanFunds may be credit enhanced through the eProcess described above, using a corresponding matching eLoanFund CDS, as described for eMBS above.

VIII. Example Computer System Implementation

Figure 10:
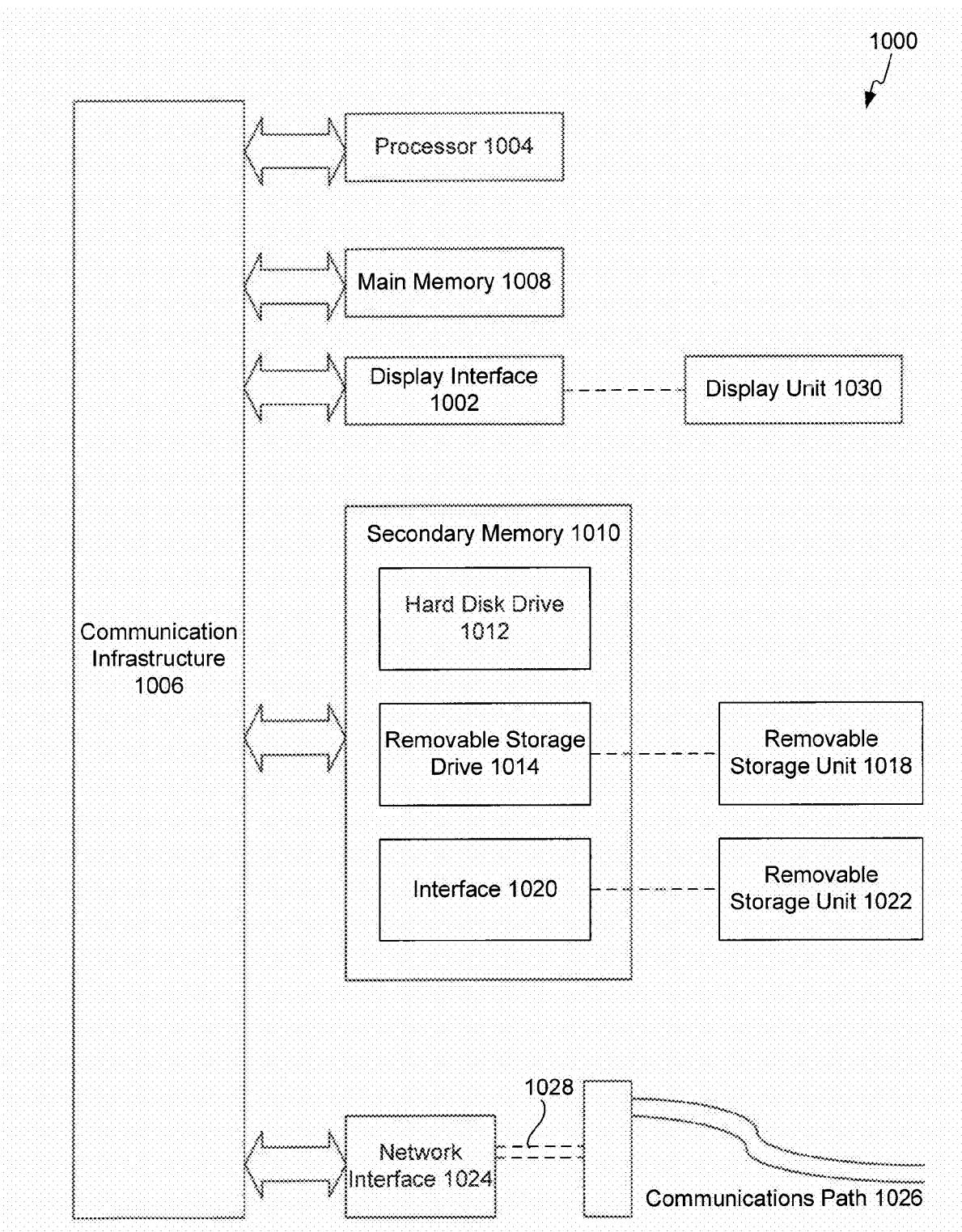
FIG. 10 depicts an example computer system in which embodiments of the present invention may be implemented.

Various aspects of the present invention can be implemented by software, firmware, hardware, or a combination thereof. FIG. 10 illustrates an example computer system 1000 in which the present invention, or portions thereof, can be implemented as computer-readable code. For example, the methods illustrated by flowcharts 300 of FIG. 3, 400 of FIG. 4, 500 of FIG. 5, 600 of FIGS. 6, and 800 of FIG. 8, can be implemented in system 1000. Various embodiments of the invention are described in terms of this example computer system 1000. After reading this description, it will become apparent to a person skilled in the relevant art how to implement the invention using other computer systems and/or computer architectures.

Computer system 1000 includes one or more processors, such as processor 1004. Processor 1004 can be a special purpose or a general purpose processor. Processor 1004 is connected to a communication infrastructure 1006 (for example, a bus or network).

Computer system 1000 also includes a main memory 1008, preferably random access memory (RAM), and may also include a secondary memory 1010. Secondary memory 1010 may include, for example, a hard disk drive 1012, a removable storage drive 1014, and/or a memory stick. Removable storage drive 1014 may include a floppy disk drive, a magnetic tape drive, an optical disk drive, a flash memory, or the like. The removable storage drive 1014 reads from and/or writes to a removable storage unit 1018 in a well-known manner. Removable storage unit 1018 may include a floppy disk, magnetic tape, optical disk, etc. that is read by and written to by removable storage drive 1014. As will be appreciated by persons skilled in the relevant art(s), removable storage unit 1018 includes a computer usable storage medium having stored therein computer software and/or data.

In alternative implementations, secondary memory 1010 may include other similar means for allowing computer programs or other instructions to be loaded into computer system 1000. Such means may include, for example, a removable storage unit 1022 and an interface 1020. Examples of such means may include a program cartridge and cartridge interface (such as that found in video game devices), a removable memory chip (such as an EPROM, or PROM) and associated socket, and other removable storage units 1022 and interfaces 1020 that allow software and data to be transferred from the removable storage unit 1022 to computer system 1000.

Computer system 1000 may also include a communications interface 1024. Communications interface 1024 allows software and data to be transferred between computer system 1000 and external devices. Communications interface 1024 may include a modem, a network interface (such as an Ethernet card), a communications port, a PCMCIA slot and card, or the like. Software and data transferred via communications interface 1024 are in the form of signals that may be electronic, electromagnetic, optical, or other signals capable of being received by communications interface 1024. These signals are provided to communications interface 1024 via a communications path 1026. Communications path 1026 carries signals and may be implemented using wire or cable, fiber optics, a phone line, a cellular phone link, an RF link or other communications channels.

In this document, the terms "computer program medium" and "computer usable medium" are used to generally refer to media such as removable storage unit 1018, removable storage unit 1022, and a hard disk installed in hard disk drive 1012. Signals carried over communications path 1026 can also embody the logic described herein. Computer program medium and computer usable medium can also refer to memories, such as main memory 1008 and secondary memory 1010, which can be memory semiconductors (e.g. DRAMs, etc.). These computer program products are means for providing software to computer system 1000.

Computer programs (also called computer control logic) are stored in main memory 1008 and/or secondary memory 1010. Computer programs may also be received via communications interface 1024. Such computer programs, when executed, enable computer system 1000 to implement the present invention as discussed herein. In particular, the computer programs, when executed, enable processor 1004 to implement the processes of the present invention, such as the steps in the methods illustrated by flowcharts 300 of FIG. 3, 400 of FIG. 4, 500 of FIG. 5, 600 of FIGS. 6, and 800 of FIG. 8, discussed above. Accordingly, such computer programs represent controllers of the computer system 1000. Where the invention is implemented using software, the software may be stored in a computer program product and loaded into computer system 1000 using removable storage drive 1014, interface 1020, hard drive 1012 or communications interface 1024.

Embodiments of the invention are also directed to computer program products including software stored on any computer useable medium. Such software, when executed in one or more data processing device, causes a data processing device(s) to operate as described herein. Embodiments of the invention employ any computer useable or readable medium, known now or in the future. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, optical storage devices, MEMS, nanotechnological storage device, etc.), and communication mediums (e.g., wired and wireless communications networks, local area networks, wide area networks, intranets, etc.).

IX. Conclusion

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. It should be understood that the invention is not limited to these examples. The invention is applicable to any elements operating as described herein. Accordingly, the breadth and scope of the present invention should not be limited by any of the above-described exemplary embodiments, but should be defined only in accordance with the following claims and their equivalents.

What is claimed is:

1. A method comprising:
   purchasing, by one or more computing devices, a credit default swap contract on an exchangeable security, wherein the exchangeable security is comprised of multi-obligor financial instruments;
   exchanging, by the one or more computing devices, the exchangeable security for a separate single enhanced security that is a combination of the exchangeable security and the credit default swap contract;
   delivering, by the one or more computing devices the enhanced security to an investor;
   delivering, by the one or more computing devices, the credit default swap contract to an account held at a clearing member;
   receiving, by the one or more devices, notification of a credit event in at least one financial instrument of the multi-obligor financial instruments of the exchangeable security;
   redeeming, by the one or more computing devices, the credit default swap contract on the financial instrument; and
   paying, by the one or more computing devices, a principal balance of the financial instrument to the investor.

2. The method of claim 1, further comprising:
   taking possession of the financial instrument or the collateral for the financial instrument; and
   selling the financial instrument or the collateral for the financial instrument.

3. The method of claim 1, wherein the multi-obligor financial instruments are mortgages, and wherein the exchangeable security is a mortgage backed security.

4. The method of claim 1, wherein the multi-obligor financial instruments are non-collateralized debt securities.

5. A non-transitory computer-readable storage device having instructions stored thereon, execution of which, by a computing device, causes the computing device to perform operations comprising:
   purchasing a credit default swap contract on an exchangeable security, wherein the exchangeable security is comprised of multi-obligor financial instruments;
   exchanging the exchangeable security for a separate single enhanced security that is a combination of the exchangeable security and the credit default swap contract;
   delivering the enhanced security to an investor
   delivering the credit default swap contract to an account held at a clearing member;
   receiving notification of a credit event in at least one financial instrument of the multi-obligor financial instruments of the exchangeable security;
   redeeming the credit default swap contract on the financial instrument; and
   paying a principal balance of the financial instrument to the investor.

6. The computer-readable storage device of claim 5, the operations further comprising:
   taking possession of the financial instrument or the collateral for the financial instrument; and
   selling the financial instrument or the collateral for the financial instrument.

7. The computer-readable storage device of claim 5, wherein the multi-obligor financial instruments are mortgages, and wherein the exchangeable security is a mortgage backed security.

8. The computer-readable storage device of claim 5, wherein the multi-obligor financial instruments are non-collateralized debt securities.

9. A system comprising:

a non-transitory memory configured to store one or more modules comprising:

- a purchasing module configured to purchase a credit default swap contract on an exchangeable security, wherein the exchangeable security is comprised of multi-obligor financial instruments,
- an exchanging module configured to exchange the exchangeable security for a separate single enhanced security that is a combination of the exchangeable security and the credit default swap contract,
- a first delivering module configured to deliver the enhanced security to an investor,
- a second delivering module configured to deliver the credit default swap contract to an account held at a clearing member,
- a receiving module configured to receive notification of a credit event in at least one financial instrument of the multi-obligor financial instruments of the exchangeable security,
- a redeeming module configured to redeem the credit default swap contract on the financial instrument, and
- a paying module configured to pay a principal balance of the financial instrument to the investor; and one or more processors, operably connected to the memory, configured to process the modules.

10. The system of claim 9, further comprising:

a taking module configured to take possession of the financial instrument or the collateral for the financial instrument; and a selling module configured to sell the financial instrument or the collateral for the financial instrument.

11. The system of claim 9, wherein the multi-obligor financial instruments are mortgages, and wherein the exchangeable security is a mortgage backed security.

12. The system of claim 9, wherein the multi-obligor financial instruments are non-collateralized debt securities.

* * * * *